United States Patent
Archer et al.

[11] Patent Number: 6,148,356
[45] Date of Patent: *Nov. 14, 2000

[54] SCALABLE COMPUTER SYSTEM

[75] Inventors: David W. Archer; D. Michael Bell; Doug Moran; Steve Pawlowski, all of Beaverton, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/013,518

[22] Filed: Jan. 26, 1998

Related U.S. Application Data

[63] Continuation-in-part of application No. 08/579,297, Dec. 27, 1995.

[51] Int. Cl.$^7$ ................................................. G06F 13/38
[52] U.S. Cl. ............................................ 710/127; 710/128
[58] Field of Search ............................ 710/128, 129, 710/100, 261, 1, 101, 127, 131

[56] References Cited

U.S. PATENT DOCUMENTS

| | | | |
|---|---|---|---|
| 5,255,376 | 10/1993 | Frank | 711/141 |
| 5,396,602 | 3/1995 | Amini et al. | 710/113 |
| 5,450,551 | 9/1995 | Amini et al. | 710/119 |
| 5,499,346 | 3/1996 | Amini et al. | 710/128 |
| 5,522,050 | 5/1996 | Amini et al. | 710/126 |
| 5,548,730 | 8/1996 | Young | 710/100 |
| 5,564,026 | 10/1996 | Amini | 710/128 |
| 5,568,619 | 10/1996 | Blackledge | 710/101 |
| 5,581,714 | 12/1996 | Amini et al. | 710/128 |
| 5,590,287 | 12/1996 | Zeller et al. | 710/127 |
| 5,592,631 | 1/1997 | Kelly et al. | 710/113 |
| 5,596,725 | 1/1997 | Ferguson et al. | 710/54 |
| 5,603,051 | 2/1997 | Ezzet | 710/2 |
| 5,651,137 | 7/1997 | MacWilliams et al. | 711/141 |
| 5,682,484 | 10/1997 | Lambrecht | 710/128 |
| 5,734,850 | 3/1998 | Kenney | 710/129 |
| 5,771,360 | 6/1998 | Gulick | 710/128 |
| 5,828,865 | 10/1998 | Bell | 703/27 |
| 5,892,964 | 4/1999 | Horan et al. | 712/33 |
| 5,987,552 | 11/1999 | Chittor et al. | 710/128 |

*Primary Examiner*—Meng-Al T. An
*Assistant Examiner*—Stacy Whitmore
*Attorney, Agent, or Firm*—R. Edward Brake

[57] ABSTRACT

A computer system includes a host processor coupled to a host bus. A bridge controller is coupled to the host bus and to a plurality of first buses. The computer system also includes one or more bus bridges, each coupled to the bridge controller via one or more of said first buses. Each bus bridge is connected to one or more second buses. Either the first buses or the second buses are each configurable in either an independent mode in which the bus operates independently, or a combined mode in which two or more of said first buses or said second buses are combined to create a single bus.

15 Claims, 5 Drawing Sheets

SCALABLE COMPUTER SYSTEM

CROSS-REFERENCE TO RELATED APPLICATIONS

This application is a continuation-in-part of application Ser. No. 08/579,297 filed on Dec. 27, 1995 and entitled "Dual Mode Bus Bridge For Interfacing A Host Bus And A Personal Computer Interface Bus," hereby incorporated by reference.

BACKGROUND OF THE INVENTION

The invention generally relates to computer systems and in particular to a scalable computer system.

Modern computer systems are available for a variety of applications, including home use, business applications, servers and mobile computers (laptops, personal digital assistants, etc.). Each application may have different processor, memory and input/output (I/O) requirements. As a result, computer manufacturers typically manufacture different systems for different applications and different requirements. For example, a home personal computer (PC) (e.g., single processor, and very limited I/O and memory capabilities) may have a completely different architecture and capabilities than a server (multi processor, greater I/O and memory capabilities). However, as a particular computer's usage and applications expand, it may be desirable to expand the memory and I/O capabilities of that computer. However, most computer systems are not designed to be significantly upgraded due to inherent architectural limitations. Rather, most current computer systems are fixed capacity systems and cannot be easily expanded or upgraded.

A computer system typically includes a memory controller and an I/O controller. For current systems, the memory controller typically interfaces a fixed amount of memory to the host bus, and the I/O controller typically interfaces a fixed number of I/O buses to the host bus. For example, A PCI-to-host bridge may interface a Peripheral Component Interface (PCI) bus to the host bus. Typically one bridge is required for each PCI bus. A PCI bus is a high performance, high bandwidth bus configured in accordance with protocols established by the PCI Special Interest Group. The PCI-to-host bridge is provided, in part, to facilitate conversion of data from the PCI format to a format employed by the host bus. The only technique available to increase memory and I/O capabilities is to add additional controllers or components to the host bus. However, many state of the art host buses are highly sensitive to the number of components, such as bridges, connected to the host bus. With such buses the maximum permissible clock rate is often inversely proportional to the number of components connected to the host bus due to the electrical load supplied by each component. Accordingly, the connection of additional bridges or component directly to the host bus results in a lowering of the maximum permissible clock rate, thereby lowering the overall performance of the system. As a result, the connection of an additional PCI bridge may lower the maximum permissible bus rate to a level which significantly hinders the performance of the overall computer system. Thus, a user is typically forced to purchase a new computer system to obtain significant additional I/O and memory capabilities. Therefore, there is a need for a computer system that is more flexible and can be expanded more easily to meet the growing memory and I/O needs without significantly degrading system performance.

SUMMARY OF THE INVENTION

According to an embodiment of the present invention, a computer system includes a host processor coupled to a host bus. The computer system includes a bridge controller that is coupled to the host bus and connected to a plurality of first buses. The computer system also includes one or more bus bridges, each coupled to the bridge controller via one or more of said first buses. Each bus bridge is connected to one or more second buses. Either the first buses or the second buses are each configurable in either an independent mode in which the bus operates independently, or a combined mode in which two or more of said first buses or said second buses are combined to create a single bus. According to another embodiment of the present invention, the first buses and the second buses are both configurable in either the independent mode or the combined mode.

DETAILED DESCRIPTION

Figure 1:
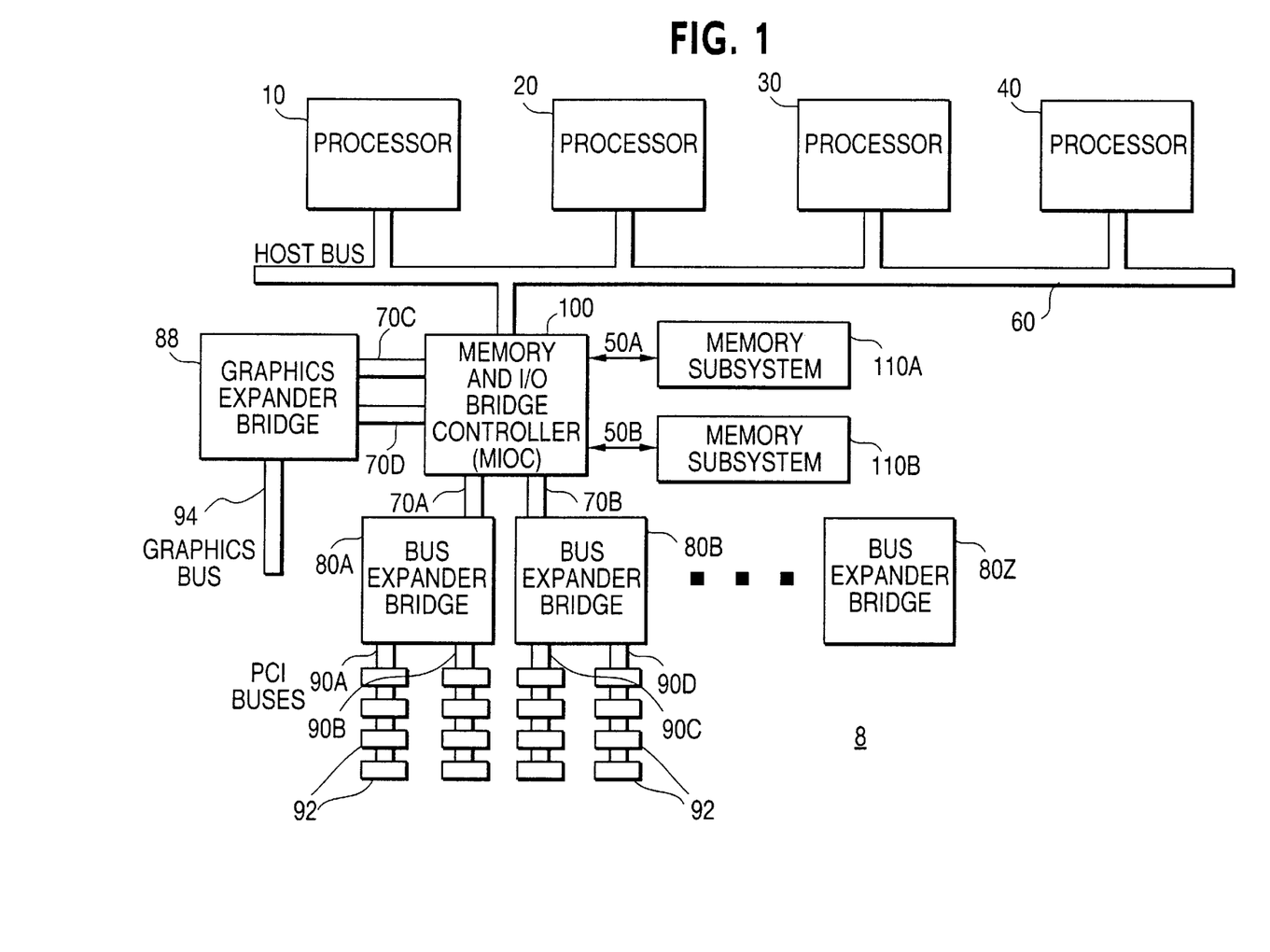
FIG. 1 is a block diagram illustrating a computer system according to an embodiment of the present invention.

Referring to the figures in which like numerals indicate like elements, FIG. 1 is a block diagram illustrating a computer system according to an embodiment of the present invention. Computer system 8 includes one or more processors, such as processors 10, 20, 30 and/or 40. The processors are connected to a host bus 60 of computer system 8. A plurality of memory subsystems 110, including subsystems 110A and 110B are connected to host bus 60. Memory subsystems 110A and 110B are connected to host bus 60 via lines 50A and 5OB, respectively. Memory subsystem 110A and 110B each include a memory array, such as dynamic random access memory (DRAM) array and associated control logic. Computer system 8 also includes a memory and input/output (I/O) bridge controller (MIOC) 100 connected to host bus 60 for interfacing one or more external buses (e.g., PCI buses) and memory subsystems 110 to host bus 60. Although MIOC 100 is shown as a single block or component in FIG. 1, the MIOC 100 can alternatively be provided as a separate memory controller and a separate I/O bridge controller.

Computer system 8 also includes a plurality of bus expander bridges 80 (including bus expander bridges 80A, 80B, . . . 80Z). Bus expander bridges 80A and 80B are connected to MIOC 100 via expander buses 70A and 70B, respectively. MIOC 100 includes a plurality of expander bus ports. Each expander bus port accommodates or can be connected to an expander bus 70. Each bus expander bridge 80 interfaces one or more external buses (such as PCI buses 90A, 90B, 90C and 90D) to MIOC 100 via an expander bus 70. Computer system 8 also includes a graphics expander bridge 88 connected to MIOC 100 via expander buses 70C and 70D. Graphics expander bridge 88 interfaces a graphics bus 94 to MIOC 100 via expander buses 70C and 70D. One or more graphics devices (e.g., graphics cards) can be attached to graphics bus 94. Graphics bus 94 can be, for example, an Accelerated Graphics Port (AGP) bus.

Although only one graphics expander bridge 88 is shown in FIG. 1, there may be several graphics expander bridges 88 or other devices each connected to MIOC 100 via one or more expander buses 70. Likewise, while FIG. 1 shows only four expander buses (70A, 70B, 70C and 70D) connected to MIOC 100, MIOC 100 may be connected to many additional expander buses 70 to allow the I/O capabilities of computer system 8 to be easily expanded.

According to an embodiment of the present invention, expander buses 70A, 70B, 70C, 70D, etc. are each a fast 16-bit wide bidirectional data bus that carries commands, addresses, data and transaction ID information. In addition, each expander bus 70 includes two additional control bits.

Each bus expander bridge 80 includes multiple PCI ports wherein each PCI port is provided for connecting and interfacing to a PCI bus. In the embodiment illustrated in FIG. 1, bus expander bridge 80A includes two PCI ports for accommodating two PCI buses 90A and 90B. Similarly, bus expander bridge 80B includes two PCI ports for accommodating two PCI buses 90C and 90D. Although only two PCI buses 90 are connected to each bridge 80 in FIG. 1, each bridge 80 can include additional PCI buses 90 to allow the I/O capabilities of computer system 8 to be expanded. A plurality of PCI expansion slots 92 are connected to each PCI bus 90 to allow one or more PCI devices to be plugged in or connected to each PCI bus 90. A wide variety of PCI devices or adapters may be plugged in to PCI expansion slots 92, such as a PCI-compatible magnetic hard-disk drive.

According to the present invention, one or more bus expander bridges 80 can be coupled to host bus 60 via MIOC 100. However, MIOC 100 applies only a single electrical load to host bus 60. Therefore, the MIOC 100 along with bus expander bridges 80 and graphics expander bridges 88 of the present invention allow for multiple external buses (e.g., PCI buses, graphics buses) to be connected to host bus 60 without degrading host bus performance because the multiple external buses appear as a single electrical load on host bus 60.

Although bus expander bridges 80A and 80B each provide an interface to PCI buses 90, the expander bridges 80A and 80B of the present invention could alternatively interface to other types of external buses. Therefore, the bus expander bridge 80 of the present invention is therefore not limited to interfacing to PCI buses.

According to an embodiment of the present invention, each bus expander bridge 80 provides two independent 32-bit, 33 MHZ, Rev. 2.1 compliant PCI interfaces. Each PCI interface requires 50 signals for the bus, plus 12 additional arbitration and support signals according to the PCI standard. Each bus expander bridge 80 provides the primary control and data interface between the PCI buses 90A and 90B and the expander buses 70A and 70B. Each bus expander bridge 80 includes PCI ports for accommodating multiple PCI buses as illustrated in FIG. 1.

In addition, each bus expander bridge 80 can also be configured to combine multiple PCI buses to provide a single PCI bus having increased bandwidth. According to an embodiment of the present invention, each bus expander bridge 80 can be configured to provide two independent 32-bit PCI buses (independent 32-bit mode) or alternatively to combine the two 32-bit PCI buses (buses 90A and 90B for bridge 80A, or 90C and 90D for bridge 80B) to obtain a single 64-bit PCI bus (combined 64-bit mode). Therefore, the bus expander bridge 80 of the present invention provides improved flexibility because each bus expander bridge 80 can be configured to accommodate different sized buses.

Each bus expander bridge 80 can be configured in either the independent 32-bit mode or the combined 64-bit mode using a variety of techniques. For example, the bridge 80 can be configured by setting the state of a 64-bit mode pin input to bridge 80 using a jumper, by programming one or more silicon fuses in bridge 80, or by processor 10 initializing bridge 80.

MIOC 100 performs several functions. First, MIOC 100 provides an interface to the host bus 60. MIOC 100 monitors processor initiated transactions, interpreting addresses and directing claimed addresses to the memory subsystems 110 (host-DRAM transactions) or to PCI buses 90 (host-PCI transactions). Second, MIOC 100 also accepts transactions forwarded from the PCI buses 90, through bus expander bridges 80 (or from graphics bus 94 through graphics expander bridge 88) and across expander buses 70. Accesses directed to the memory subsystem 110 (PCI-DRAM transactions) have zero length equivalents placed on the host bus 60 to snoop the processor caches, while the data transfer is handled directly between the MIOC and the memory subsystem 110. Third, the MIOC 100 operates as a memory controller for memory subsystem 110, issuing commands to the control circuits on subsystem 110 and accepting data returned from the DRAMs of memory subsystem 110. Finally, the MIOC 100 provides data buffer storage for the data received from the memory array of memory subsystem 110, the host bus 60 and the PCI buses 90.

The computer system 8 of the present invention provides a scalable architecture that allows CPU, memory and I/O capabilities to be expanded using the same set of basic components. First, computer system 8 can be provided with one processor, or multiple processors. Second, MIOC 100 can accommodate a variable number (e.g., either one or two memory cards or memory subsystems (110A, 110B, etc.) via interface lines 50A or 50B. This allows memory capabilities of computer system 8 to be expanded.

In addition, the I/O capabilities of computer system 8 can be expanded at several different levels. The MIOC 100 includes several expander buses 70 that are available for adding one or more additional bus expander bridges 80, graphics expander bridges 88 or other devices. In addition, MIOC 100 can be configured to operate each expander bus 70 either independently (e.g., independent 16-bit mode), or to combine two or more expander buses 70 to create a single expander bus having greater bandwidth (e.g., combined 32-bit mode). For example, the MIOC 100 illustrated in FIG. 1 has been configured to operate the 16-bit expander buses 70A and 70B independently, and to combine expander buses 70C and 70D to create a single 32-bit wide expander bus that better accommodates the high bandwidth requirements from graphics bus 94. The MIOC 100 can be configured to select either the combined or independent mode for each expander bus 70 using a variety of techniques. For example, MIOC 100 can be configured by setting the state of one or more pins using jumpers, by programming one or more silicon fuses in MIOC 100, or by processor 10 initializing MIOC 100. In addition, each PCI bus 90 connected to bus expander bridge 80 can be configured in either an independent mode in which each 32-bit PCI bus 90 operates independently, or a combined 64-bit mode in which two 32-bit PCI buses 90 are combined to provide a single 64-bit PCI bus.

Therefore, computer system 8 provides a great deal of flexibility in allowing memory and I/O capabilities to be scaled to meet user needs. Moreover, system cost and size advantageously scale with capability. As a result, a single computer system 8 can be initially assembled that includes a host processor 10, a host bus 60, MIOC 100, and, for example one memory subsystem 110A and one bus expander bridge 80A. Initially, the MIOC 100 includes many ports for expander buses 70 that are available but unused. The bus expander bridge 80A can be configured to meet the initial needs of the user (e.g., two 32-bit PCI buses or a single 64-bit PCI bus). Additional memory subsystems 110, bus expander bridges 80 and graphics expander bridges 88 can be connected to unused expander bus ports of MIOC 100 and configured as needed to meet new memory and I/O requirements for the system.

According to an embodiment of the present invention, I/O expansion of computer system 8 can be facilitated through an auto-detection feature. The auto-detection feature allows MIOC 100 to automatically detect the connection of one or more bus expander bridges 80, graphics expander bridges 88 or other devices. Before attempting any configuration access to a bus expander bridge 80 or a graphics expander bridge 88, or configuring the memory-mapped and I/O ranges in either MIOC 100 or bridges 80 or 88, the bus expander ports of MIOC 100 must be tested to determine if there is a device connected to each bus expander port. This is accomplished using a check connection register (CHKCON register) and a check connection protocol, described below.

The check connection protocol can be provided or defined for all bus expander ports of MIOC 100. The CHKCON register is located in the MIOC 100 and includes a test port flag and a live port flag for each bus expander port of MIOC 100. For example, test port A flag and live port A flag are associated with the port for expander bus 70A, and test port B flag and live port B flag are associated with the port for expander bus 70B. A processor write operation to set a test port flag triggers the check connection protocol for that port. After the check connection protocol has been performed, the live port flag indicates whether or not there is a bridge or other device connected to the port. If the live port flag is cleared (after the check connection protocol), this indicates that there is no device connected to the corresponding port. While if the live port flag is set, this indicates the presence of a bridge or other device connected to the port. Therefore, success or failure of the check connection protocol results in setting or clearing, respectively of the corresponding live port flag. According to one embodiment of the check connection protocol, after reset, processor 10 can set one or more selected test port flags for each port to be tested. For example, processor 10 can set the test port flags for all bus expander ports. Processor 10 then periodically checks the status of each corresponding live port flag. After a predetermined period of time has elapsed without a live port flag being set, the processor 10 assumes there is no device connected to the port.

Figure 2:
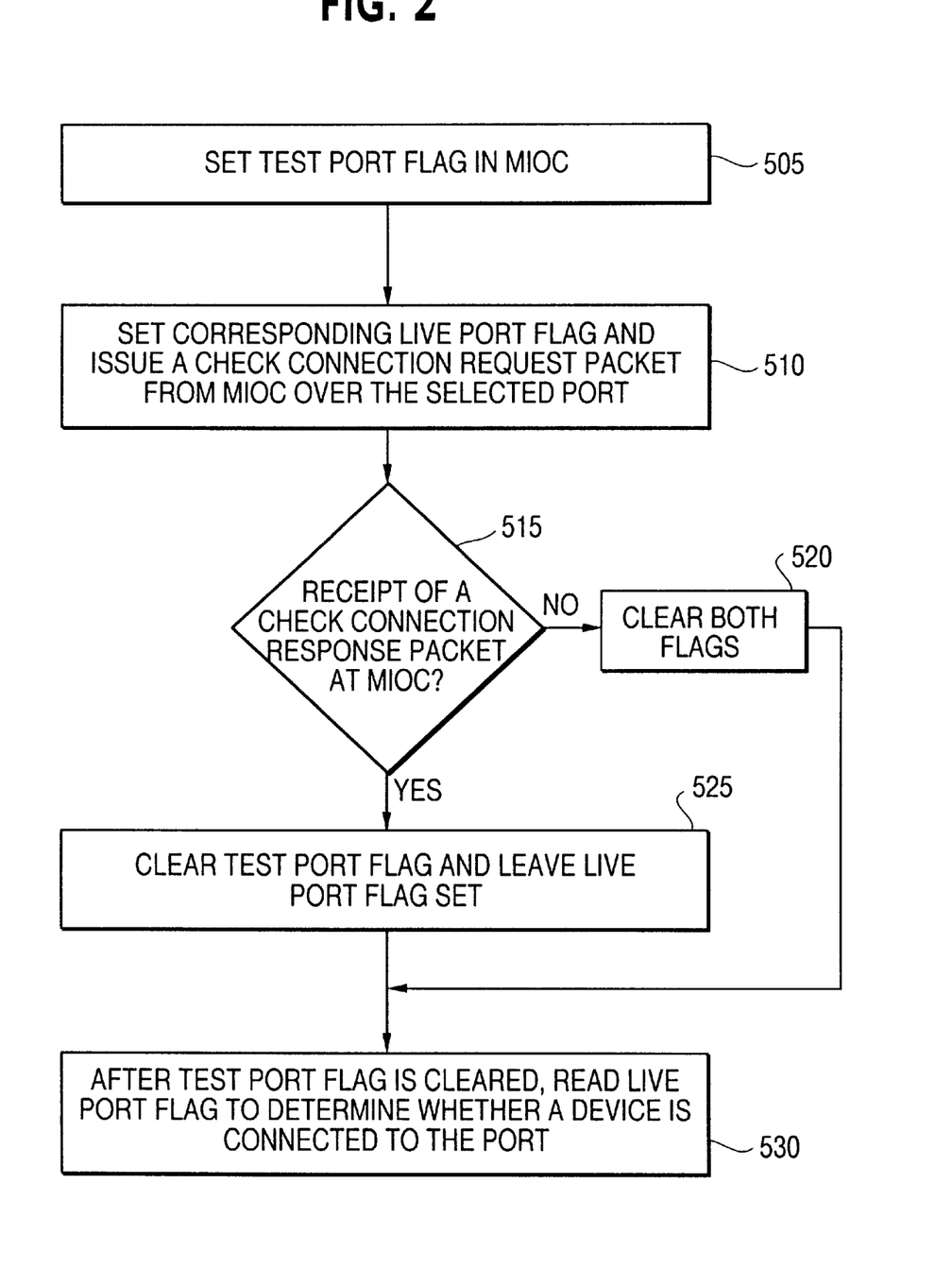
FIG. 2 is a flow chart illustrating a check connection protocol according to an embodiment of the present invention.

FIG. 2 is a flow chart illustrating a check connection protocol according to an embodiment of the present invention. At step 505, the processor 10, operating under Basic Input/Output System (BIOS) software control after system reset, sets a test port flag in the CHKCON register in MIOC 100 for the bus expander port (or ports) to be tested.

At step 510, in response to the processor 10 setting the test port flag, the MIOC 100 sets the corresponding live port flag in the CHKCON register in MIOC 100 and issues a check connection request packet over the selected bus expander port.

If a device (such as a bus expander bridge 80) is connected to the bus expander port being tested, the device outputs a check connection response packet (including predetermined data) to MIOC 100 in response to the check connection request packet. At step 515, the MIOC 100 determines whether it has received a check connection response packet containing the predetermined data (indicating a proper response from a bridge or device).

At step 525, if the MIOC 100 detects a check connection response packet containing the predetermined data from the connected device. The MIOC 100 then clears the test port flag (indicating that the processor 10 can now read the live port flag) and leaves the live port flag set (indicating a successful check connection test).

At step 520, if after some predetermined period of time, no check connection response packet arrives at MIOC 100 over the selected port (or the packet arrives with incorrect data), then the MIOC 100 clears the test port flag (indicating that the test is over and the processor 10 can read the live port flag) and clears the live port flag (indicating that there was no bridge or device connected to the selected bus expander port).

At step 530, the processor periodically reads the test port flag. After the test port flag is cleared, the processor then reads the live port flag. If the live port flag is set, this indicates that there is a bridge or device connected to the selected port. If the live port flag is cleared, this indicates that there is no device connected to the selected port.

According to another embodiment of the check connection protocol, the port for expander bus 70A is always connected to a bus expander bridge 80A. After reset, the port for expander bus 70A always comes up active, while other ports come up disabled and must be tested through the check connection protocol. According to this embodiment, this is required because the check connection protocol is performed by BIOS software which is fetched across the live port for bus 70A. If the port for bus 70A is not live after reset, the computer system 8 cannot access the BIOS software and the system itself will not boot.

After the processor 10 determines which expander bus ports are connected to a device, the processor then reads each device's configuration (CONFIG) register to determine what type of device is attached to the port (e.g., a bus expander bridge 80 or a graphics expander bridge 88). For example, processor 10 (under BIOS control) can read an ID Code in a bridge's CONFIG register to determine that bridge 80A is a bus expander bridge 80. Processor 10 also reads each device's CONFIG register to determine whether the expander buses 70 are configured in an independent mode or a combined mode (e.g., combining two expander buses 70 to create a single 32-bit bus). (Alternatively, this information describing the mode of expander buses 70 may be read from a CONFIG register in MIOC 100). Because the PCI buses 90 connected to bus expander bridges 80 can be connected in either an independent mode or a combined mode, processor 10 also reads a mode flag in each bridge's CONFIG register to determine whether the PCI buses 90 have been configured in the independent mode or the combined mode. Likewise, for graphics expander bridge 88, processor 10 (under BIOS control) reads the ID code in the bridge's CONFIG register to determine that the bridge is a graphics expander bridge 88. However, the graphics expander bridge 88 has only one mode (AGP bus mode), which is known to the BIOS. The CONFIG register in each bridge can be initially set through one or more jumpers or using other techniques.

In a similar fashion, processor 10 can check the memory ports connected to memory subsystems 110 to determine how many memory cards or memory subsystems 110 are connected over lines 50A and 50B, and the amount of memory in each memory subsystem. The auto-detection feature allows additional components and buses to be added and configured as needed.

After detecting the presence of each device connected to MIOC 100 (using the check connection protocol) and determining the identity and configuration of each device, processor 10 (under BIOS control) then configures each device by mapping the available memory mapped I/O address space among all the devices, and by initializing several parameters in each device. Similarly, the processor 10 then configures the MIOC 100 based on the memory mapping of I/O address space. According to one embodiment of the present invention, processor 10 configures MIOC 100 by writing address mapping information to a DEVMAP (device map) register in MIOC 100 to indicate which I/O address range corresponds to each port of MIOC 100. The DEVMAP register contains a memory map matching each port to an address range. It is important for processor 10 to determine the mode (independent or combined) for the buses 70 and 90 of each bridge because separate address ranges should be provided for independent buses. However, shared (or combined) buses can share the same I/O address range. For example, a 1 Meg available I/O address range may be divided equally among four bridges 80, with each bridge having a 250K address range. For example, at a first bridge, the 250K address range is divided to provide 125K to each of the two 32-bit PCI buses (independent mode) connected to the first bridge. Likewise, for two PCI buses in the combined mode, the entire 250K address range for the bridge 80 can be allocated to the combined PCI buses, as an example. Thus, the MIOC 100 uses the memory map (e.g., stored in the DEVMAP register) to identify the destination (the port number) for a packet or transaction received from processor 10. The MIOC 100 then sends the received packet to the bus expander port identified by the memory map (that corresponds to the packet address).

Rather than using jumpers or silicon fuses to permanently or semi-permanently select the configuration of various devices, one or more devices can be reconfigured as the system is expanded to meet new I/O and memory requirements. The ROM BIOS software can be changed to automatically write or change the configuration register to reconfigure each device if necessary.

In addition, MIOC 100 includes bus drivers for each port. After processor 10 determines which ports are connected to a bridge or other device, processor 10 issues a command (or otherwise controls MIOC 100) to cause MIOC 100 to disable the bus drivers for each bus expander port that is not connected to a device (e.g., each port that did not pass the check connection protocol). If the bus drivers are CMOS drivers, these drivers can be disabled by tristating their outputs. If the bus drivers are open drain, then it is unnecessary to disable these drivers.

One or more of the bus expander bridges 80 and graphics expander bridges 88 (including the connected external buses and devices) can be removed from or plugged into MIOC 100 without powering down computer system 8. As a result, it is possible to replace a malfunctioning bus expander bridge, graphics expander bridge 88 without taking computer system 8 offline. As a result, the bridges of the present invention are "hot plug" capable. While systems currently offer PCI hot plug systems in which a PCI device can be added to or removed from a PCI bus (e.g., bus 90) while the system is running, there is no facility available for replacing or adding an entire expander bridge (including one or more buses) while the system is running.

The procedure for replacing a bus expander bridge card according to an embodiment of the present invention will now be briefly described. As an example, the bus expander bridge card that will be replaced includes a bus expander bridge 80 and multiple PCI buses 90. Each PCI bus 90 includes one or more PCI devices or PCI adapters connected thereto. The bus expander bridge card includes a connector for connection to the motherboard, where the MIOC is provided.

The user first notifies computer system 8 that the expander bridge card will be removed from computer system 8. The user can notify the computer system 8 by using a keyboard or console to identify the card, or by pressing a predetermined button on the outside of computer system 8 that is associated with the specific card to be removed. A green LED, for example, on the outside of the computer system 8 is lit to indicate that the card is operational or active. In response to the notification from the user, the computer system 8 disables the bus drivers connected to the bus expander bridge. Next, processor 10 places the bus expander bridge 80 in a static mode. This can be performed, for example, by resetting the bridge 80 (e.g., the processor issuing a reset command to bridge 80). In the reset or static state, the bus expander bridge 80 cannot issue or output any packets or transactions to MIOC 100. Processor 10 then remaps the memory mapped I/O address space to indicate that the ports connected to the bus expander bridge 80 are no longer associated with an I/O address range of system 8. This can be performed, for example, by reconfiguring the DEVMAP register in MIOC 100. By remapping the I/O address space to remove the bus expander bridge 80 and the associated external (PCI) buses from the map, MIOC 100 will no longer forward any packets or transactions to the ports connected to the bridge 80 that will be removed. The address space can be remapped by leaving an address gap, or by reallocating the entire I/O address space across the remaining bridges. When the I/O address space has been remapped, the computer system 8 provides an indication to the user that the bus expander bridge card can be removed from system 8. For example, a red LED can be lit to indicate that the bus expander bridge card is inoperative and can now be removed. A new bus expander bridge card is plugged in to the mother board and the user provides an indication to computer system 8 that this new card has been plugged in (e.g., by using the keyboard or by actuating a switch associated with this card).

The computer system 8 powers up the new card and enables the bus drivers in the MIOC coupled to the new card. The MIOC 100 then checks the connection between the MIOC 100 and the new bus expander bridge 80 by executing the check connection protocol. If the new bus expander bridge passes the check connection protocol, the MIOC and the new bridge 80 are configured and the I/O address space are remapped to include the new bus expander bridge and the external buses (e.g., buses 90) connected to the new bridge 80. In operation, various transactions flow across computer system 8 including transactions between processor 10 (or other processors) and PCI devices connected to PCI buses 90 (or graphics devices connected to bus 94), transactions between processor 10 and memory subsystem 110, and transactions between different PCI devices.

According to an embodiment of the present invention, the bus transactions across host bus 60 and expander buses 70A and 70B are full split transactions and consist of a request packet and a completion packet. There are two types of transactions: a read transaction, and a write transaction. The request packet initiates a transaction. Completion packets are used to return data (only for a read request), to indicate that a transaction has been completed on the destination device, and to reallocate buffer or queue resources.

A packet of information consists of multiple 32-bit words (also known as double words or Dwords). Each packet includes a header that consists of address and control information and can include a data portion. The header of the packet is provided as one or more Dwords that includes the command (read or write), address information, a transaction ID identifying the transaction, routing information, and additional control information. The data portion of a packet can include one or more Dwords of data. A completion packet contains the transaction ID corresponding to the original request, an indication that the transaction was completed, and other control information. A read completion packet also includes the requested data retrieved (if any) in response to the read request. A write completion contains no data but indicates that the write was completed successfully.

Transactions in computer system 8 can be categorized as either inbound transactions or outbound transactions. Inbound transactions are those transactions initiated by a PCI master connected to buses 90A or 90B. For example, a PCI device operating as a PCI master may initiate an inbound read operation to memory sub-system 110. An outbound transaction is a transaction initiated by, for example, processor 10 and directed to a device connected to PCI buses 90A or 90B. For example, an outbound transaction could include a processor read of a hard disk drive connected to one of the PCI expansion slots 92.

Figure 3:
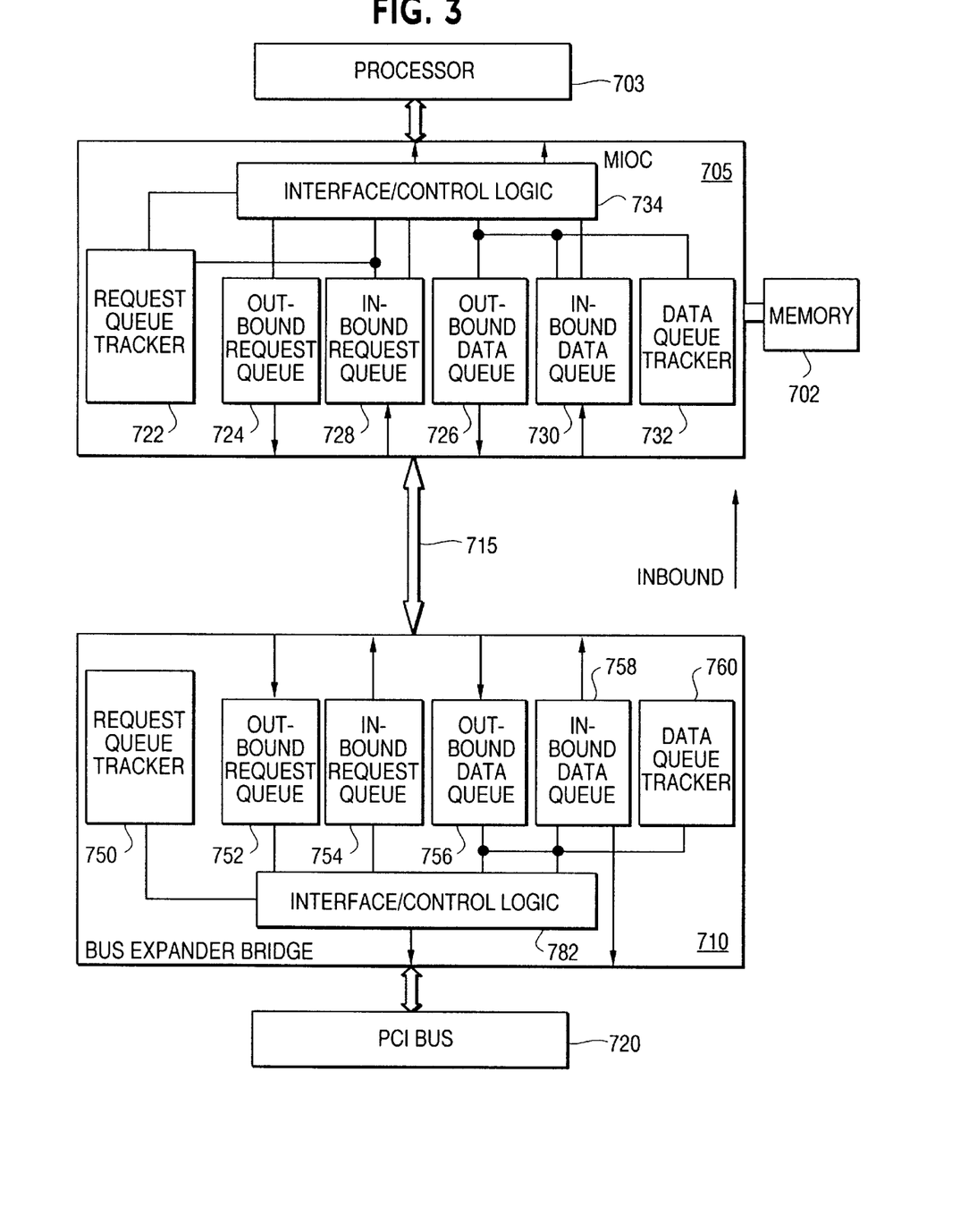
FIG. 3 is a block diagram illustrating a portion of a computer system according to an embodiment of the present invention.

FIG. 3 is a block diagram illustrating a portion of computer system 8 according to an embodiment of the present invention. Referring to FIG. 3, a MIOC 705 is coupled to memory 702 and a processor 703. The MIOC 705 is coupled to a bus expander bridge 710 through an expander bus 715. The bus expander bridge 710 includes one connection to a PCI bus (e.g,. A 64 bit PCI bus). However, bridge 710 supports multiple bus connections (e.g., 2 32-bit PCI connections).

The MIOC 705 includes request queue tracker logic 722, data queue tracker logic 732, outbound data buffer (or queue) 726, inbound request queue 728 and inbound data queue 730. Also shown is interface/control logic 734 which provides supporting logic for interfacing with memory 702 and processor 703, as well as providing the request packets and confirmation packets that are described below.

For purposes of simplification of explanation, the data communicated between memory 702, processor 703 and the MIOC 705 is shown to be transmitted through the interface/control logic 734. However, it is contemplated that data may be transmitted directly between queues and the memory 702 and processor 703. The request queue tracker logic 722 and data queue tracker logic 732 respectively track how fill the respective queues 724, 752, 726, and 756 are, such that once a queue is full, the tracker logic prevents a packet from being generated and stored in the queues 724 and 726.

According to the present embodiment, trackers 722 and 732 function as a counter to maintain counts of available queue space. Interface/control logic 734 operates in conjunction with trackers 722 and 732 to issue the corresponding control signals and data to processor 703 and memory 702 to permit or prevent outbound packet generation and placement in the corresponding queues. Inbound request queue 728 and inbound data queue 730 respectively receive in bound requests and confirmation packets (and associated data) from bus expander bridge 710. In one embodiment, the write data and read data is separately queued and tracked.

Bus expander bridge 710 is divided into substantially identical halves or sides. Queues for only one side of bus expander bridge 710 are illustrated in FIG. 3. Bus expander bridge 710 is configured similarly to the MIOC 705, and includes a request queue tracker 750, data queue tracker 760, outbound request queue 752, inbound request queue 754, outbound data queue 756, inbound data queue 758 and interface/control logic 782. Interface control logic 782 is used to communicate with PCI bus 720 and to generate the request and confirmation packets.

Figure 4:
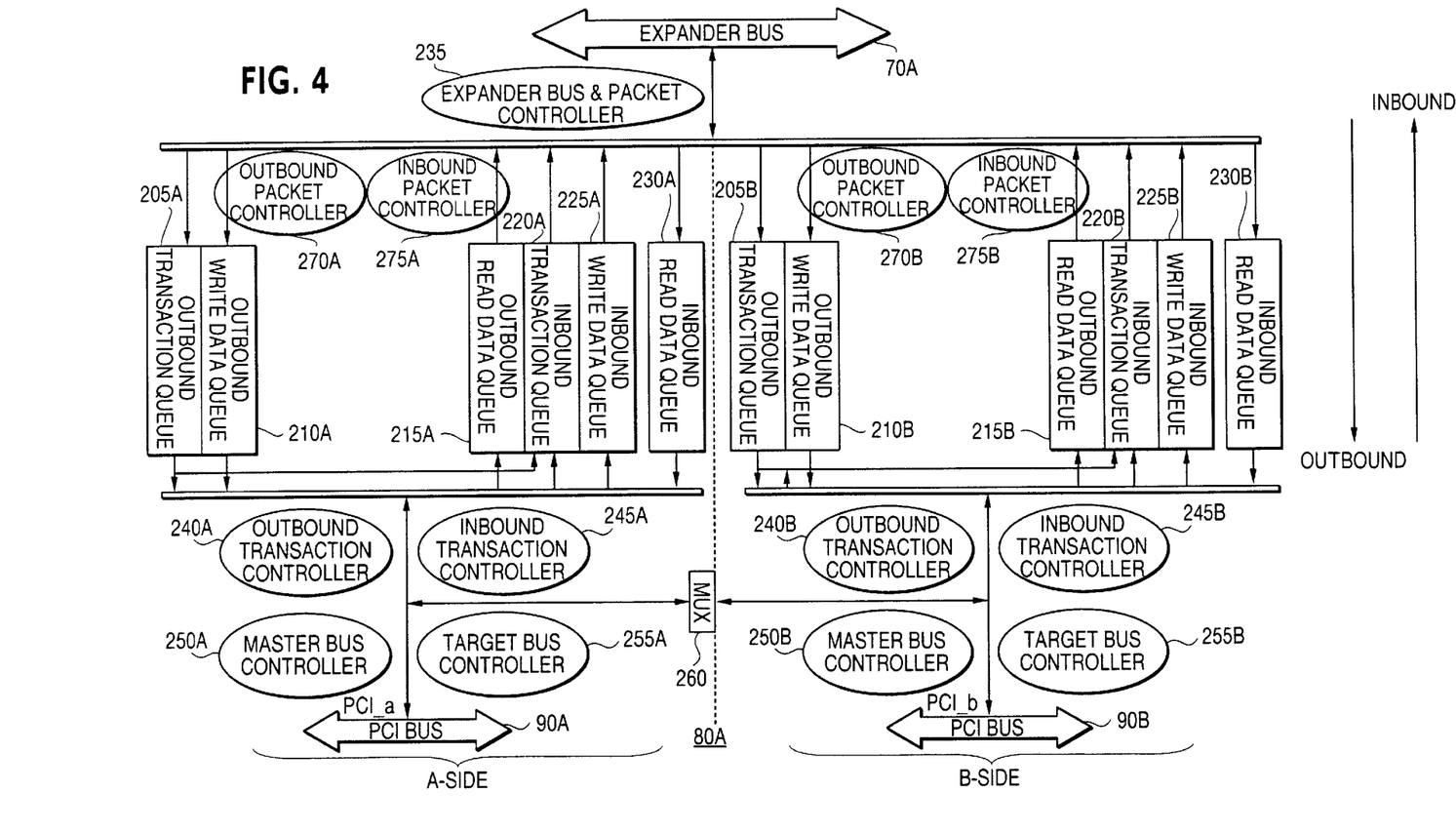
FIG. 4 is a block diagram illustrating a bus expander bridge according to an embodiment of the present invention.

FIG. 4 is a block diagram illustrating a bus expander bridge according to an embodiment of the present invention. As shown in FIG. 4, bus expander bridge 80A is connected between expander bus 70A and PCI buses 90A and 90B. Bridge 80A is divided into two substantially identical halves or sides (A-side and B-side) wherein each side services one of the 32-bit PCI buses (90A or 90B) while in the independent 32-bit mode. There is one common expander bus controller 235 that services both sides of bus expander bridge 80A.

The specific elements or components for each side of bus expander bridge 80A will now be briefly described. As noted, each side of bus expander bridge 80A is substantially the same. As illustrated in FIG. 2, corresponding elements on each side include the same identifying numeral. To differentiate A-side and B-side elements of bus expander bridge 80A, the identifying numerals on the A-side end in the letter "A," while the identifying numerals on the B-side end in the letter "B."

Each side of the bus expander bridge 80A includes several queues to store address and control information and data, including:

an, outbound transaction queue (OTQ) 205 for storing addresses and control information for outbound read and write requests and inbound read completion packets;

an outbound write data queue (OWDQ) 210 for storing outbound write data;

an outbound read data queue (ORDQ) 215 for storing outbound read data;

an inbound transaction queue (ITQ) 220 for storing addresses and control information for inbound read and write requests and outbound completion packets;

an inbound write data queue (IWDQ) 225 for storing inbound write data; and two inbound read data queues (IRDQ) 230, for storing inbound read data for two different read completions.

As illustrated in FIG. 4, each side of the bus expander bridge 80A also contains six controllers that are responsible for controlling the operation of the queues described above. There is also one expander bus controller 235 in the bridge 80A that is common to both sides. Specifically, each side of bridge 80A includes:

an outbound transaction controller 240 which is responsible for the loading and the unloading of the OTQ 205, the OWDQ 210 and ORDQ 215;

an inbound transaction controller 245, which is responsible for the loading and the unloading of ITQ 220, IRDQ's 230, and IWDQ 225;

a master bus controller 250 which interfaces between the outbound transaction controller 250 and the PCI bus for outbound transactions;

a target bus controller 255 which interfaces between the inbound transaction controller 245 and the PCI bus for inbound transactions;

an outbound packet controller 270 for receiving outbound packets from the expander bus controller 235 and forwarding the packets to the queues; and an inbound packet controller 275 for forwarding packets from the queues to the expander bus controller 235.

In addition, there are several multiplexers (muxes) 260 that are used to selectively route information through bridge 80A.

Figure 5:
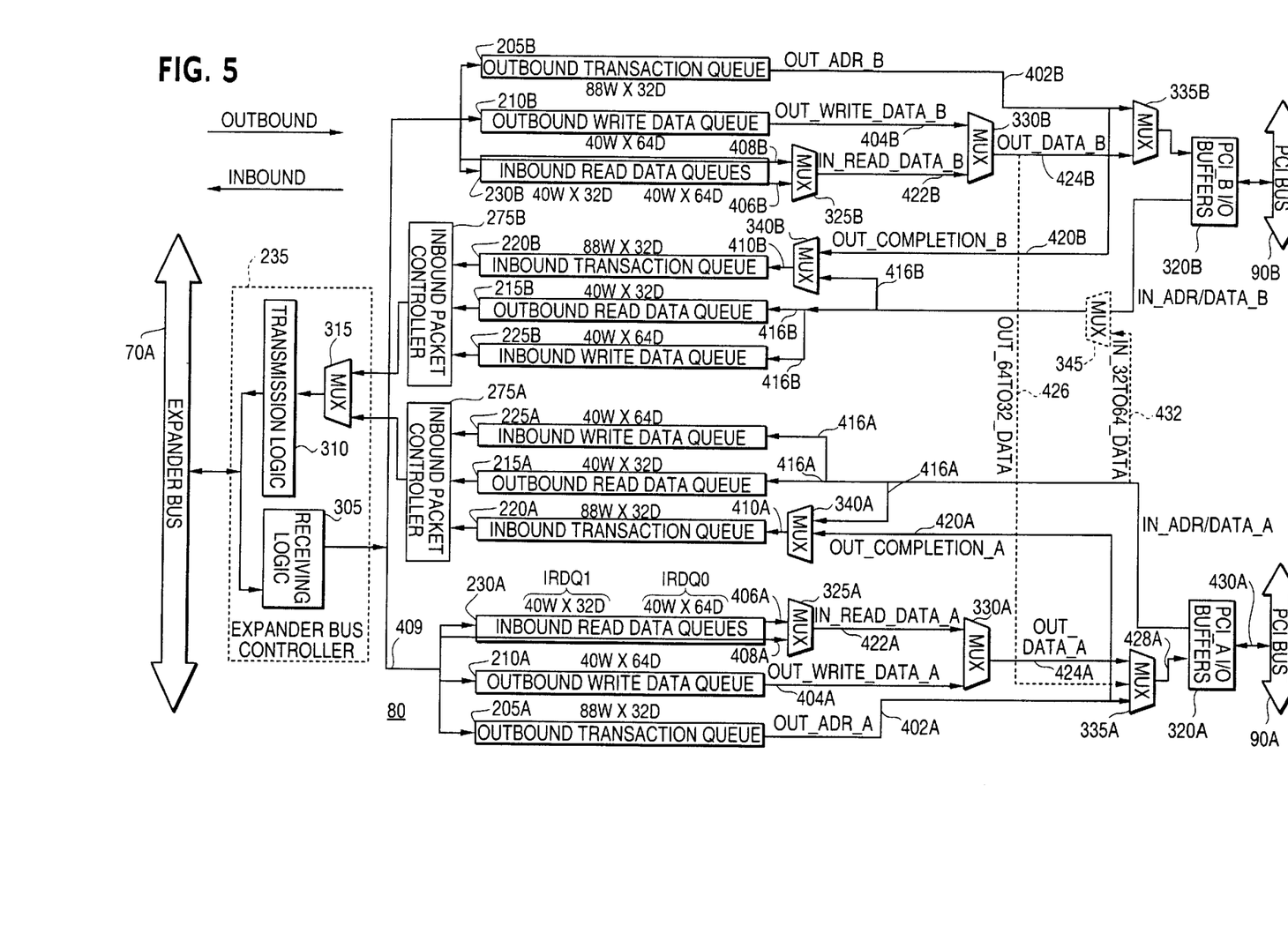
FIG. 5 is a block diagram illustrating further details of the bus expander bridge of FIG. 4 according to an embodiment of the present invention.

FIG. 5 is a block diagram illustrating further details of the bus expander bridge 80A of FIG. 4 according to an embodiment of the present invention. As described above for FIG. 4, the bus expander bridge 80A is split into two substantially identical sides, the A-side and the B-side. Each side includes a full set of queues (described above) and six controllers.

As illustrated in FIG. 5, expander bus controller 235 includes receiving logic 305 for receiving expander bus packets from expander bus 70A and transmission logic 310 for transmitting expander bus packets onto expander bus 70. Expander bus controller 235 also includes a mux 315 connected to the input of transmission logic 310 for selecting information from either inbound packet controller 275A or inbound packet controller 275B. The dashed lines or data paths (lines 426 and 432) and the dashed mux 345 in FIG. 5 are provided to configure bridge 80A in the combined 64-bit mode.

The following description (in the next two paragraphs) generally applies to each side (both A-side and B-side) of the bridge 80A, except where A-side or B-side is specifically noted. Only the dashed lines (lines 426 and 432) and the dashed mux 345 are not duplicated on both sides of the bridge 80A.

The output of receiving logic 305 is input to the OTQs 205, OWDQs 210 and IRDQs 230 on both sides via line 409. IRDQ 230 (on each side) includes two IRDQs, shown as IRDQ0 and IRDQ1. Outputs from the IRDQs 230 are input to mux 325 via lines 406 and 408. The output of mux 325 is connected via line 422 (In_ReadData$_A$ on the A-side, In_ReadData$_B$ on the B-side) to mux 330. The output of mux 330 is connected via line 424 (Out_Data_A on the A-side, Out_Data_B on B-side) to mux 335. The output of mux 335 is connected via line 428 to buffers 320. The buffers 320A are connected to PCI bus 90A, and buffers 320B are connected to PCI bus 90B. The output of OWDQ 210 is connected via line 404 (Out_Write_Data_A on the A-side, Out_Write_Data_B on the B-side) to mux 330. The output of OTQ 205 is connected via line 402 (Out_Adr$_A$ for the A-side, and Out_Adr_B on the B-side) to mux 335. The output of mux 330B is connected via dashed line 426 (Out_64to32_Data) to mux 335A.

Line 416 (In_Adr/Data_A on the A-side, In_Adr/Data_B on the B-side) connects an output of buffer 320 to a mux 340, ORDQ 215, and IWDQ225. The output of OTQ 205 (line 402) is connected to mux 340 via line 420 (Out_Completion_A or Out_Completion_B). The output of mux 340 is input via line 410 to ITQ 220. The outputs of ITQ 220, ORDQ 215 and IWDQ 225 are input to inbound packet controller 275. The outputs from inbound packet controllers 275A and 275B are input to mux 315.

Mux 345 is provided on the B-side and receives as inputs, an output of buffer 320B (In_Adr/Data_B) and the output from buffer 320A (In_Adr/Data_A) via dashed line 432 (In_32to64_Data). Line 416B is the output from mux 345.

The operation of bus expander bridge 80A will now be described by describing several bus transactions. (The other bus expander bridges 80B, 80C, 80D, etc. which may be connected to MIOC 100 can each be separately configured in either independent 32-bit mode or combined 64-bit mode, and each operates in the same manner as bus expander bridge 80A.)

The Bus Expander Bridge in Independent 32-Bit Mode

Only transactions for the A-side of the bus expander bridge 80A will be discussed. However, the B-side of the bus expander bridge is symmetric and operates in the same manner as the A-side when bridge 80A is in 32 bit mode.

1. 32-Bit Mode Expander Bridge: Inbound Read (e.g., a read from a PCI master to memory subsystem 110)

For an inbound read operation, a PCI device issues a PCI read transaction. The PCI read transaction is received by buffers 320A and passed to the target bus controller 255A. Target bus controller 255A determines that the read transaction is valid, decodes the destination of the read transaction, and then passes the address and destination information to the inbound transaction controller 245A (there is no data in a read request packet). The inbound transaction controller 245A generates control information that includes a transaction ID, and routing information that indicates which PCI side (A-side or B-side) the packet came from. Inbound transaction controller 245A formats the control and address information (the read request packet) into an expander bus packet and outputs this address and control information onto line 416A to store this address and control information in the ITQ 220A via mux 340A.

Inbound transaction controller 245A generates an ITQEnableA signal to enable ITQ 220A to store the control and address information of this read request packet that has been placed on line 416A. As a result, although ORDQ 215A and IWDQ 225A are also connected to line 416A, ORDQ 215A and IWDQ 225A remain disabled at this time and therefore do not store the address and control information for the packet that is output onto line 416A. (In independent 32-bit mode, inbound transaction controller 245B can independently generate an ITQEnableB signal to enable ITQ 220B). The expander bus controller 235 then outputs the read request packet to the MIOC 100 via expander bus 70A.

When the requested data becomes available from memory subsystem 110, MIOC 100 generates a completion packet that includes the requested data and the read completion (control information such as the routing information and transaction ID), and sends the completion packet to bus expander bridge 80A via expander bus 70A.

Expander bus controller 235 examines the control information (specifically the routing information) of the completion packet to determine whether this packet is directed to the PCI A-side or B-side. Completion packets are directed to the same side from which the request originated. Expander bus controller 235 first outputs the control information (including a transaction ID) of the completion packet onto line 409. At this time, if the packet is directed to the A-side, controller 235 generates an OTQEnableA signal to enable the OTQ 205A (A-side) to store the control information in OTQ 205A that is driven onto line 409. Likewise, if the packet is directed to the B-side, controller 235 generates and OTQEnableB to allow the control information to be stored in the OTQ 205B (B-side). This example assumes that the request packet originates from the A-side, and therefore, the completion packet is directed back to the A-side.

Next, expansion bus controller 235 outputs the requested data onto line 409 to store the data in one of two inbound read data queues (IRDQ0 or IRDQ1) on the side which the packet is directed. OTQ 205A can store up to two read completions (address and control information for two different read completions, including the transaction ID, the number of Dwords, routing information, etc.). The corresponding data for each read completion is stored in one of the two IRDQs 230A (IRDQ0 and IRDQ1). According to one embodiment, IRDQ0 can store up to 64 Dwords, and IRDQ1 can store up to 32 Dwords. A control signal (either IRDQ0EnableA or IRDQ1EnableA) is generated by controller 235 to enable one of the IRDQs 230A to store the requested data. Likewise, one of the control signals (IRDQ0EnableB or IRDQ1EnableB) is generated for the B-side IRDQs if the packet is directed to the B-side.

The outbound transaction controller 240A reads the OTQ 205A and detects the inbound read completion packet. The outbound transaction controller 240A forwards the inbound read completion packet to the inbound transaction controller 245A, which decodes the transaction ID to determine which read request the data belongs to. When the bus expander bridge 80A receives a repeated read request from the PCI master for this transaction (e.g., having the same address and other control information as the original transaction), the inbound transaction controller 245A outputs the requested data (shown as In_Read_Data_A) from either IRDQ0 or IRDQ1 230A onto PCI bus 90A via muxes 325A, 330A and 335A. The inbound transaction controller 245A controls mux 325A to selectively output the data stored in either IRDQ0 or IRDQ1, and the target bus controller 255A controls muxes 330A and 335A. IRDQ0 can store up to 64 Dwords (for example), and IRDQ1 can store up to 32 Dwords. Each of the Dwords for a read completion are output to the PCI bus 90A on successive clock cycles until all the data from the particular IRDQ is output or until the transaction is terminated by the PCI master.

2. 32-Bit Mode Expander Bridge: Inbound Write
(e.g., a write from a PCI master to memory subsystem 110).

The address and data signals on the expansion bus 70 are multiplexed. Likewise, the address and data signals on the PCI buses 90A and 90B are also multiplexed. For an inbound write, the PCI master provides the address and control information, and then provides the data to be written. This information is received by the expander bus bridge 80A on bus 90A over successive clock cycles. The address and control information of a PCI write transaction is received first at PCI buffer 320A and passed to the target bus controller 255A. Target bus controller 255A determines that the write transaction is valid, and then decodes the destination of the write transaction and then passes the address and destination information to the inbound transaction controller 245A. Inbound transaction controller 245A generates control information that includes the source and destination and formats the address and control information into a expander bus packet format and outputs the address and control information (shown as In_Adr_A) onto line 416A to store this address and control information in the ITQ 220A via mux 340A by generating ITQEnableA signal.

Next, the data of the PCI write transaction is received from the PCI master. The inbound transaction controller 245A formats the data, and then stores the data in IWDQ 225A by outputting the data onto line 416A and by generating a IWDQEnableA signal to enable the IWDQ 225A. (In independent 32-bit mode and in combined 64-bit mode, the inbound transaction controller 245B can independently generate a IWDQEnableB signal to enable IWDQ 225B).

The expander bus controller 235 outputs the address and control information from ITQ 220A, and then outputs the data from IWDQ 225A for transmission to MIOC 100 over expander bus 70A. After the data has been written to memory subsystem 110, a completion packet is received by expander bus controller 235 from MIOC 100.

3. 32-Bit Mode Expander Bridge: Outbound Read
(e.g., a read from a processor 10 to a PCI target).

For an outbound read, a read request packet is received by expander bus controller 235 from the MIOC 100. Controller 235 examines the packet header (address and control information) to determine if the packet is directed to PCI A-side or side B. The address and control information is then routed to the OTQ on the proper side. This example assumes that the packet is directed to PCI A-side (bus 90A). The expander bus controller 235 generates an OTQEnableA signal to enable OTQ 205A to store this address and control information in OTQ 205A. The outbound transaction controller 240A also formats the address and control information in PCI format. After expander bus bridge 80A obtains ownership of PCI bus 90A, master bus controller 250A then outputs the address and control information from OTQ 205A to bus 90A via line 402A (shown as Out_Adr_A), mux 335 and buffers 320A. A portion of the address and control information is also routed via line 420A (Out_Completion_A) and stored in the outbound transaction controller 240A. The expander bus bridge 80A then outputs the address and control information onto the bus 90A.

The PCI target then provides the requested data onto the bus 90A. The outbound transaction controller 240A then stores the requested data in ORDQ 215A via line 416A by generating an ORDQEnableA signal to enable ORDQ 215A. Enabling ORDQ 215A allows ORDQ 215A to store the data provided on line 416A. (In independent 32-bit mode and combined 64-bit mode, outbound transaction controller 240B can independently generate an ORDQEnableB signal to enable ORDQ 215B). After all the data is received, the outbound transaction controller 240A generates and stores a read completion packet (control and address information, including transaction ID and number of Dwords) in the ITQ 220A via line 420A and mux 340A. An ITQEnableA signal is generated to enable ITQ 220A to store the completion packet (address and control information). The completion packet is shown on line 420A as Out_Completion_A. The expander bus controller 235 outputs the completion packet (address and control information) onto the expander bus 70A from ITQ 220A, and then outputs the requested data from ORDQ 215A.

4. 32-Bit Mode Expander Bridge: Outbound Write
(e.g., a write from a processor 10 to a PCI target).

For an outbound write, a write request packet is received by expander bus controller 235 from the MIOC 100. Controller 235 examines the packet header (address and control information) to determine if it is directed to PCI A-side or side B. (This example assumes that the packet is directed to A-side). The address and control information is then routed to the OTQ on the proper side by outputting the address and control information onto line 409. This example assumes that the packet is directed to PCI A-side (bus 90A). The expander bus controller 235 generates an OTQEnableA signal to enable OTQ 205A to store this address and control information in OTQ 205A. Next controller 235 outputs the data onto line 409 and generates an OWDQEnableA signal to enable the OWDQ 210A to store the data. After expander bus bridge 80A obtains ownership of PCI bus 90A, master bus controller 250A then outputs the address and control information from OTQ 205A to bus 90A via line 402A (shown as Out_Adr_A), mux 335 and buffers 320A. A portion of the address and control information (including transaction ID, address and number of Dwords) is also routed via line 420A (Out_Completion_A) and stored in the outbound transaction controller 240A. The data is then output from OWDQ 210A to bus 90A via line 404A (shown as Out_write_Data_A), mux 330A, line 424A (data shown as Out_Data_A) mux 335A and buffers 320A.

Using the PCI interface over bus 90A, the PCI target then notifies the bus expander bridge 80A that the data has been written to the PCI target. The outbound transaction controller 240A generates and stores a write completion packet (control and address information, including transaction ID, address and number of Dwords) in the ITQ 220A via line 420A and mux 340A, and by generating an ITQEnableA signal to enable ITQ 220A. The completion packet is shown on line 420A as Out_Completion_A. The expander bus controller 235 outputs the completion packet (address and control information) onto the expander bus 70A from ITQ 220A.

The B-side of the bus expander bridge 80A operates in a similar manner as that described above for A-side when the bridge 80A is in the independent 32-bit mode. The A-side and the B-side of the bus expander bridge 80A can operate simultaneously, with expander bus controller 235 handling packets from both sides of bridge 80A. As shown in FIG. 1, there may be several bus expander bridges 80 (bridges 80A, 80B, . . . ) connected to MIOC 100. Each of the expander bridges 80 operate in parallel and each can be configured to operate in either independent (or multiple) 32-bit mode, or a combined 64-bit mode.

The Bus Expander Bridge in Combined 64-Bit Mode

The bus expander bridge 80A can be configured to operate in a combined 64-bit mode in which the two 32-bit PCI buses 90A and 90B are combined to provide a single 64-bit PCI bus. Likewise, more than two external buses (e.g., PCI or other buses) can be connected to a bus expander bridge 80 and combined to provide an external bus having even greater bandwidth. For example, three 32-bit external buses can be combined to provide an external 96-bit bus.

A 64-bit mode pin on the bus expander bridge 80A can be used to configure the bus expander bridge in 64-bit mode. Other techniques can also be used to select the 64-bit mode. While in combined 64-bit mode, the bus expander bridge 80A can communicate over the 64-bit PCI bus to a 64-bit PCI device (a PCI device that can provide/accept two Dwords or 64 bits of data at a time), or to a 32-bit PCI device (a PCI device capable of providing or accepting data only 32 bits at a time). When a 64-bit bus expander bridge 80A is communicating to a 32 bit PCI device, only half of the available bandwidth for bridge 80A is used.

According to an embodiment of the present invention, the bus expander bridge 80A uses the two PCI sides (A-side and B-side) in an "even-odd" scheme while in 64-bit mode. In this even-odd scheme, all even addressed data (where address[2] is 0) is placed in the queues on the A-side of the bridge 80A, and all odd addressed data (where address[2] is 1) is placed in the data queues on the B-side of bridge 80A. This scheme also lends itself to working with the 64-bit PCI specification, which requires that all even addressed data be placed in the lower 32 bits (the A-side) and all odd addressed data be placed in the upper 32 bits (B-side). While the bus expander bridge zap is in 64-bit mode and communicating with a 32 bit PCI device, all odd addressed data is routed to PCI A-side.

According to an embodiment of the present invention, the queues (including the transaction and data queues) and the controllers on both the A-side and the B-side of bridge 80A operate in parallel when bridge 80A is in the combined 64-bit mode.

However, according to another embodiment of the bus expander bridge 80A of the present invention, while in combined 64-bit mode, only the controllers on the A-side of bridge 80A are used, while all controllers on the B-side are reset (unused); and only the transaction queues on the A-side are used, while the transaction queues on the B-side are disabled. Additional details are described below regarding this embodiment of the present invention.

Therefore, according to an embodiment of the present invention, selecting the 64-bit mode disables all B-side controllers (outbound transaction controller 240B, inbound transaction controller 245B, master bus controller 250B, target bus controller 255B and packet controllers 270B and 275B), and all B-side transaction queues (OTQ 205B and ITQ 220B). For example, the transaction queues on the B-side can be disabled in 64-bit mode by not generating the enable signals for the B-side transaction queues. As a result, the transaction queues on the A-side (OTQ 205A and ITQ 220A) should be sufficiently large to accommodate the additional transactions (from both A-side and B-side). Thus, the transaction queues on the A-side can be made, for example, twice as large (or deep) as those on the B-side to accommodate this even-odd scheme while in 64-bit mode.

This even-odd scheme in which the B-side controllers and the B-side transaction queues in the bus expander bridge 80A are disabled in 64-bit mode provides a significant savings in the number of 32-bit data paths routed between the two sides, and reduces the number and complexity of the required circuits as compared to fully operating both sides of the bridge 80A in parallel in 64-bit mode.

The operation of bus expander bridge 80A for combined 64-bit mode will now be described. To avoid repetition, only the differences between the combined 64-bit mode operations and the independent 32-bit mode operations are discussed in detail.

1. 64-Bit Mode Expander Bridge: Inbound Read From 32-Bit PCI Master

The PCI read transaction (including address and control information) is always issued from the PCI master to the bus expander bridge 80A on the PCI A-side (over bus 90A) (regardless whether the read transaction comes from a 32-bit or 64-bit master). The inbound transaction controller 245A receives the address and control information and formats this information into an expander bus packet. The expander bus packet is then output onto line 416A to store this address and control information in the ITQ 220A via mux 340A. The expander bus controller then outputs the packet to the MIOC 100. After the data is read from memory subsystem 110, the completion packet (including data) is provided to the expander bus controller 235 via bus 70A. The address and control information of the read completion packet is always stored in OTQ 205A (A-side) (the controllers and ITQs on B-side are disabled). However, the data is stored in IRDQ0 or IRDQ1 230A (A-side) if the data is even addressed, and stored in IRDQ0/IRDQ1 230B (B-side) if the data is odd addressed.

When the bus expander bridge 80A receives a repeated PCI read transaction (having the same address and other control information as the original PCI read transaction) from the PCI master, the even addressed data on the A-side and the odd addressed data on the B-side are output to PCI bus 90A (A-side). The even addressed data stored on the A-side IRDQs 230A is output from IRDQ0/IRDQ1 230A via mux 325A, mux 330A and mux 335A. The odd addressed data stored in the B-side IRDQs 230B is output from IRDQ0/IRDQ1 230B, through mux 325B and mux 330B as Out_64to32_Data along line 426 to mux 335A. Mux 335A then selects the B-side data if the address is odd. The data is alternated from both sides until all data is output or until the PCI transaction is terminated by the PCI master.

2. 64-Bit Mode Expander Bridge: Inbound Read From 64-Bit PCI Master

After the data is read from memory subsystem 110, the completion packet (including data) is provided to the expander bus controller 235 via bus 70A. The address and control information of the read completion packet is always stored in OTQ 205A (A-side) (the controllers and ITQs on B-side are disabled). However, the data is stored in IRDQ0 or IRDQ1 230A (A-side) if the data is even addressed, and stored in IRDQ0/IRDQ1 230B (B-side) if the data is odd addressed. For a 64-bit master, the first address is always an even address.

When the bus expander bridge 80A receives a repeated read request (having the same address and command as the original read request) from the PCI master, the even addressed data (stored in IRDQs on A-side) is output to PCI A-side (bus 90A), and the odd addressed data (stored in IRDQs on B-side) is output to PCI B-side (bus 90B). The inbound transaction controller on the A-side (245A) repeatedly outputs two double words in parallel from IRDQs on both sides until all data have been output or until the PCI read transaction is terminated by the PCI master. By outputting a Dword from the A-side in parallel with a Dword from the B-side, a 64 bit PCI bus is provided.

3. 64-Bit Mode Expander Bridge: Inbound Write From 32-Bit PCI Master

A PCI write transaction is issued by the PCI master. The inbound transaction controller 245A (A-side) formats the address and control information into expander bus format and stores the address and control information in the ITQ 220A (A-side). The data arrives only on the PCI A-side (only over bus 90A). The bus expander bridge 80A is notified by the PCI master via PCI protocol that the PCI master is only a 32-bit device, and therefore, the expander bridge expects the data only on the PCI A-side.

The inbound transaction controller 245A (A-side) examines the first address of the write request packet. If the first address is even, then the data of the first Dword is stored in IWDQ 225A (A-side) via line 416A. If the first address is odd, then the first Dword is stored in IWDQ 225B via line 432 (shown as In_32to64_Data), mux 345 and line 416B. Subsequent Dwords are stored in IWDQs in alternate sides. The inbound transaction controller 245A (A-side) formats and stores the address and control information for the write request packet in the ITQ 220A (A-side) (controllers and transaction queues on B-side are disabled). The address and control information are then output by the expander bus controller 235 to the MIOC 100 as part of the write request packet.

The controller 235 then outputs the data to the MIOC 100. To identify the location (A-side or B-side) of the first Dword, the inbound packet controller examines the address information of the packet. The even or odd address of the first Dword indicates that the first Dword is located on the A-side or B-side, respectively. The first Dword is output from the A-side IWDQs if the first address is even, and obtains the first Dword from the B-side IWDQs if the first address is odd. Controller 235 outputs the data from the IWDQs, alternating from each side, beginning with the first Dword. After writing the data, the write completion packet (address and control information) is received from the MIOC 100.

4. 64-Bit Mode Expander Bridge: Inbound Write From 64-Bit PCI Master

In this case, the bus expander bridge 80A is notified via PCI protocol by the PCI master that the PCI master is a 64-bit PCI device (can send data 64 bits at a time over buses 90A and 90B). Therefore, the data for the write request packet is received over both PCI sides (over both PCI buses 90A and 90B) at the same time. The address and control information for the write request packet is stored only in the ITQ 220A (A-side) (B-side controllers and transaction queues are disabled). The data received over the A-side PCI bus is always even addressed and is stored in the IWDQ 225A (A-side), and the data received over the B-side PCI bus (90B) is always odd addressed and is stored in the IWDQ 225B (B-side). The even addressed Dword is the lower 32 bits of data. Therefore, (for a 64-bit master) the expander bus controller 235 outputs the write data to the MIOC 100 always beginning with the A-side IWDQs.

5. 64-Bit Mode Expander Bridge: Outbound Write

A write request packet is received by controller 235 from the MIOC 100. The address and control information of the write request packet is stored in the OTQ 205A (A-side), regardless whether the PCI target is a 32-bit target or a 64-bit target because transaction queues on the B-side are disabled when the bus expander bridge 80A is in combined 64-bit mode. The even addressed data is placed in the OWDQ 210A (A-side), and the odd addressed data is placed in the OWDQ 210B (B-side). At this point the expander bus bridge 80 is not aware whether the PCI target is a 32-bit or a 64-bit target. The master bus controller 250A (A-side) uses PCI protocols to determine whether the PCI target is a 32-bit target or a 64-bit target. This can be achieved, for example, by the master bus controller 250A issuing a Reg64 signal to inform the PCI target that it is 64-bit capable. The PCI target can respond with a DevSel (device select) signal and can also respond with an Ack64 signal to indicate that it is 64-bit capable. If the Master bus controller receives DevSel back but no Ack64, then the master bus controller 250A knows that the PCI target is a 32-bit target. If master bus controller receives an Ack64 signal, then it knows that the PCI target is a 64-bit PCI target.

If the PCI target is a 64-bit target, the data stored in the A-side is output onto PCI A-side bus 90A, and simultaneously, the data stored in the B-side is output onto the PCI B-side bus 90B to provide a 64 bit data path. On the other hand, if the PCI target is a 32-bit target, the data stored in both the A-side and the B-side of the bridge 80A are alternately output to the PCI A-side bus 90A, beginning with the side of the first address. For a 32-bit target, the B-side data is output from OWDQ 210B, through mux 330B, line 426 as Out_64to32_Data to mux 335A. Mux 335A alternately selects either the A-side data (Out_Data_A over line 424A) or the B-side data (Out_64to32_Data over line 426).

6. 64-Bit Mode Expander Bridge: Outbound Read

The read request packet is received from the MIOC 100. The control and address information is stored in the OTQ 220A (there is no data in a read request packet).

The master bus controller then uses the PCI protocols to determine whether the PCI target is a 32-bit target or a 64-bit target. The read request packet is then output to the PCI target over the PCI A-side bus 90A.

If the PCI target is 64-bit capable, the requested data is output from the PCI target to the bus expander bridge 80A over both PCI buses 90A (for even addressed data) and 90B (for odd addressed data) and stored in ORDQs 215A (A-side) and 215B (B-side), respectively.

If the PCI target is a 32-bit target, the requested data is provided only over the A-side PCI bus 90A to the bus expander bridge 80A. If the starting address is even, the first Dword is stored in the ORDQ 215A (A-side). If the starting address is odd, then the first Dword is stored in the ORDQ 215B (B-side). The Dwords are alternately stored in the different sides of bridge 80A. For the completion packet, the expander bus controller outputs Dwords from alternate sides. If the first address is even, the first Dword is output from the A-side. If the first address is odd, the first Dword is output from the B-side.

What is claimed is:

1. A computer system comprising:

a host processor coupled to a host bus;

a bridge controller coupled to the host bus and including a plurality of ports, at least two of said bridge controller ports each being configurable in either an independent mode in which each port operates as an independent bus interface, or a combined mode in which two or more bridge controller ports are combined to create a single bus interface having a greater bandwidth than one bus interface in independent mode;

a bus bridge coupled to at least one of said bridge controller ports via one or more first buses, the bus bridge connected to one or more second buses; and wherein said bus bridge is configurable in either an independent mode in which each said second bus operates independently or in a combined mode in which two or more second buses are combined to create a single bus having a greater bandwidth than one second bus operating in independent mode;

the bus bridge comprising:

a first set of data queues for routing data between one of the first buses and one of the second buses, and a second set of data queues for routing data between another of the first buses and another of the second buses;

a first controller for controlling operation of the first set of data queues; and a second controller for controlling operation of the second set of data queues; and wherein one of the first and second controllers is disabled and a remaining one of the first and second controllers controls both the first and second sets of data queues when said bus bridge is configured in the combined mode.

2. The computer system of claim 1 and further comprising one or more I/O devices connected to each second bus.

3. The computer system of claim 1 wherein said bus bridge comprises a selectable number of bus bridges that can be connected to the computer system to add I/O capabilities, each said bus bridge coupled to at least one of said bridge controller ports via one or more first buses, each said bus bridge being connected to one or more second buses.

4. The computer system of claim 1 wherein said bridge controller comprises an I/O bridge controller.

5. The computer system of claim 1 wherein said bridge controller comprises a memory and I/O bridge controller.

6. The computer system of claim 1 wherein said bus bridge comprises a bus expander bridge.

7. The computer system of claim 1 wherein said bus bridge comprises a graphics expander bridge.

8. The computer system of claim 1 wherein said one or more first buses comprise one or more expander buses.

9. The computer system of claim 1 wherein said one or more second buses comprise one or more PCI buses.

10. The computer system of claim 1 wherein said second buses comprise graphics buses.

11. The computer system of claim 1 and further comprising a memory subsystem coupled to the bridge controller.

12. A computer system comprising:

a host processor coupled to a host bus;

a bridge controller coupled to the host bus and connected to a plurality of first buses, at least two of said first buses each being configurable in either an independent mode in which each first bus operates independently, or a combined mode in which two or more of said first buses are combined to create a single bus having a greater bandwidth than one first bus operating in independent mode;

a bus bridge coupled to the bridge controller via one or more of said first buses, said bus bridge connected to one or more second buses; wherein each second bus is configurable in either a combined mode in which each second bus operates independently, and a combined mode in which two or more second buses are combined to create a single bus having a greater bandwidth than one second bus operating in independent mode;

the bus bridge comprising:

a first set of data queues for routing data between one of the first buses and one of the second buses, and a second set of data queues for routing data between another of the first buses and another of the second buses;

a first controller for controlling operation of the first set of data queues; and a second controller for controlling operation of the second set of data queues; and wherein one of the first and second controllers is disabled and a remaining one of the first and second controllers controls both the first and second sets of data queues when said bus bridge is configured in the combined mode.

13. The computer system of claim 12 wherein said first buses comprise expander buses.

14. The computer system of claim 13 wherein said one or more second buses comprise either a PCI bus or a graphics bus.

15. A computer system comprising:

a host processor coupled to a host bus;

a bridge controller coupled to the host bus and connected to a plurality of first buses, at least two of said first buses each being configurable in either an independent mode in which each first bus operates independently, or a combined mode in which two or more of said first buses are combined to create a single bus having a greater bandwidth than one first bus operating in independent mode;

a bus bridge coupled to the bridge controller via one or more of said first buses, said bus bridge connected to one or more second buses;

each said second bus is configurable in either a combined mode in which each second bus operates independently, and a combined mode in which two or more second buses are combined to create a single bus having a greater bandwidth than one second bus operating in independent mode;

the bus bridge comprising a first set of data queues for routing data between one of the first buses and one of the second buses, and a second set of data queues for routing data between another of the first buses and another of the second buses;

a first controller for controlling operation of the first set of data queues; and a second controller for controlling operation of the second set of data queues; and wherein even addressed data is routed through the first set of data queues and odd addressed data is routed through the second set of data queues when the bus bridge is configured in a combined mode.

* * * * *